United States Patent

Mohri et al.

[11] Patent Number: 4,952,768
[45] Date of Patent: Aug. 28, 1990

[54] ELECTRIC DISCHARGE MACHINING ELECTRODE

[75] Inventors: Naotake Mohri, No. 3837-3, Kuroishi, Shimada, Tenpaku-cho, Tenpaku-ku, Nagoya-shi, Aichi; Nagao Saito, Tokyo, both of Japan

[73] Assignees: Mitsubishi Denki Kabushiki Kaisha, Tokyo; Naotake Mohri, Aichi, both of Japan

[21] Appl. No.: 171,205

[22] Filed: Mar. 17, 1988

Related U.S. Application Data

[63] Continuation of Ser. No. 758,008, Jul. 23, 1985, abandoned.

[30] Foreign Application Priority Data

Jul. 24, 1984 [JP] Japan ................. 59-153351

[51] Int. Cl.$^5$ ............................................. B23H 7/24
[52] U.S. Cl. .................... 219/69.15; 204/291
[58] Field of Search ............... 219/69 E, 69 W, 69 R, 219/68, 69.15, 69.12, 69.11; 204/129.25, 291; 420/513, 525, 528, 555, 459, 563, 577

[56] References Cited

U.S. PATENT DOCUMENTS

| | | | |
|---|---|---|---|
| 2,861,164 | 11/1958 | Stegler | 219/69.15 |
| 3,035,151 | 5/1962 | Weglarz | 219/69.15 |
| 3,385,947 | 5/1968 | Inoue | 219/69 E |
| 3,413,435 | 11/1968 | Holtzclaw | 219/69.15 |
| 3,459,915 | 8/1969 | Swazy et al. | 219/69.15 |
| 3,496,987 | 2/1970 | Peterson et al. | 219/69.15 |
| 3,689,729 | 9/1972 | Neward et al. | 219/69 E |
| 4,287,404 | 9/1981 | Convers et al. | 219/69 W |
| 4,329,219 | 5/1982 | Druzhinin et al. | 204/291 |
| 4,341,939 | 7/1982 | Briffod et al. | 219/69 E |
| 4,373,127 | 2/1983 | Haskett et al. | 219/69 E |
| 4,459,453 | 7/1984 | Inoue | 219/69 E |
| 4,673,787 | 6/1987 | Inoue | 219/69 M |

FOREIGN PATENT DOCUMENTS

| | | | |
|---|---|---|---|
| 1061005 | 7/1959 | Fed. Rep. of Germany | 219/69 E |
| 114621 | 9/1981 | Japan | 219/69 M |
| 58-94925 | 6/1983 | Japan | 219/69 W |
| 223526 | 12/1983 | Japan | 219/69 E |

OTHER PUBLICATIONS

"EDM Electrode Material", by Trommer in IBM Technical Disclosure Bulletin, vol. 12, No. 7, Dec. 1969.

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

An electrode for precision electric discharge machining having an improved machining rate and surface smoothness with respect to conventional graphite and copper electrodes. The electrode is formed by silicon or other materials which has the same characteristics as silicon, a base of a low melting point metal or an alloy of such a low melting point metal is covered with a layer composed of a mixture of the metal and a high resistivity inorganic compound. The outer layer may be formed by adhesion or by thermal spraying or by a powder metal sintering technique.

5 Claims, 5 Drawing Sheets

CURRENT DETECTED BY CURRENT TRANSFORMER (15) WHEN COPPER OR GRAPHITE ELECTRODE IS USED
ABOUT 10 min.

CURRENT DETECTED BY CURRENT TRANSFORMER (15')

PRIOR ART

CURRENT DETECTED BY CURRENT TRANSFORMER WHEN SILICON OR ZINC-ZINC OXIDE ELECTRODE IS USED

CURRENT DETECTED BY CURRENT TRANSFORMER (15')

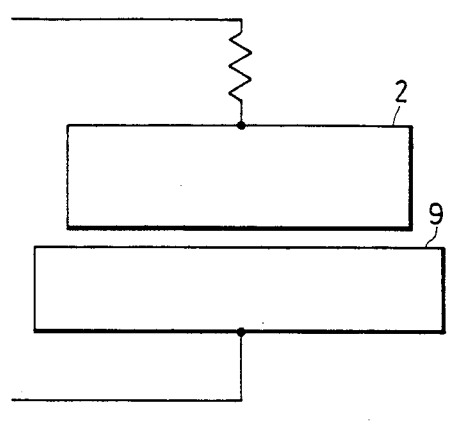
FIG. 7A
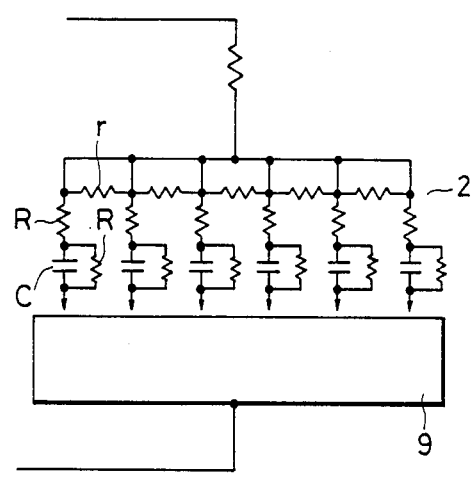
FIG. 7B
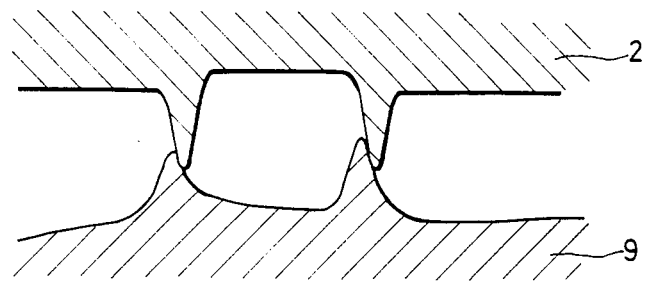
FIG. 8A PRIOR ART
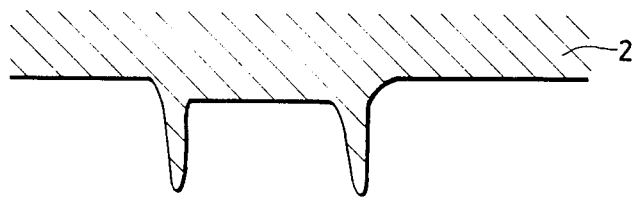
FIG. 8B
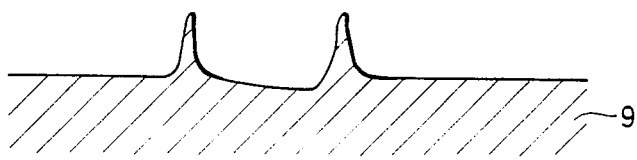

ELECTRIC DISCHARGE MACHINING ELECTRODE

This is a continuation of application Ser. No. 758,008 filed July 23, 1985 now abandoned.

BACKGROUND OF THE INVENTION

The present invention relates to a electrode intended for use with an electric discharge machining apparatus. More specifically, the present invention relates to such an electrode which provides a reduced surface roughness and is well adapted for precision machining operations.

Conventionally, for the material of electrodes used for electric discharge machining, materials such as graphite and copper have been employed. With these materials, the product $\rho \cdot \theta m$ of thermal conductivity ($f$) and melting point ($\theta m$) is generally high, thereby yielding an electrode having a low consumption rate and high machining rate.

FIG. 1 is a schematic diagram illustrating a conventional electric discharge machining apparatus. In this apparatus, machining is carried out in stages of rough, intermediate and finish (precision) machining by changing both the machining conditions and the electrode for each stage. Generally, however, each of the electrodes is made of the same type of material.

In more detail, in FIG. 1, the electric discharge machining apparatus includes a table 1 on which is positioned a workpiece to be machined, an electrode 2 disposed opposite the workpiece, replacement electrodes 2A through 2D used for varying machining operations, a hydraulic cylinder 3 for controlling the position of the electrode 2 relative to the workpiece, a numeric controller 4 for controlling operations of the various elements of the apparatus of FIG. 1, an X-axis motor 5 for moving the table 1 in the direction of the X-axis, a Y-axis motor 6 for moving the table 1 in the direction of the Y-axis, a power supply 7 for supplying discharge energy between the electrode 2 and the workpiece, and an electrode exchanging apparatus 8 for automatically exchanging the various electrodes 2 and 2A through 2D for the different stages of machining, namely, rough, intermediate and finish machining.

In this conventional machining apparatus employing conventional electrodes, machining operations through intermediate machining to produce a surface roughness of about 10 microns can be accomplished readily. However, difficulties are encountered for finish machining, for example, to provide a surface roughness of less than 5 microns over a wide area. In many cases, it would be desirable to provide a finished surface roughness of 1 micron, 0.5 microns, or less. However, doing so with the conventional apparatus and electrode is quite difficult, and in any event, very time consuming. The reasons for this will now be described.

Referring to FIG. 2, it has been discovered that, even if the amount of discharge energy supplied between the electrode 2 and a workpiece 9 is made as small as possible, over time an electric charge will accumulate in a parasitic capacitor 10 formed between the electrode 2 and the workpiece 9. Eventually, a discharge will occur at projections formed on the electrode 2 or workpiece 9 where the electric field gradient is highest. This unwanted discharge causes roughening of the surface of the workpiece 9.

Referring to FIG. 2, waveforms are shown of the current supplied from the power supply 7 and the actual current flowing between the electrode 2 and the workpiece 9 in the case where the parasitic capacitor 10 is charged. As shown by the waveform in the righthand portion of FIG. 2, the peak value of the current applied between the electrode 2 and the workpiece 9 is much higher (in the case where the parasitic capacitor 10 is charged) than the peak value of the current supplied from the power supply 7. This is an additional reason for unwanted surface roughening of the workpiece 9.

To overcome these problems, it has been proposed, as illustrated in FIG. 3, to divide the electrode 2 into segments and to connect a resistor in series with each of these segments. In the case of FIG. 3, a single switching device is provided in the power supply 7, while in the case illustrated in FIG. 4, separate switching devices 14 are connected in series with each of the resistors 13. In both cases, the capacitance between each segment of the electrode 2 and the workpiece 9 is reduced compared with a single-integral electrode in that the surface area of each of the segments opposed to the workpiece 9 is reduced. This approach, however, is also accompanied by drawbacks. Specifically, some roughening occurs due to the segmentation of the electrode, specifically, due to the presence of boundaries between the segments of the electrodes. Also, in the case of a metal or graphite electrode (the most common conventional electrode materials), if discharge is started between only a single one of the electrode segments and the workpiece, it is difficult to spread the discharge over all of the segments. Accordingly, even though finish machining may be carried out over a number of hours, is very difficult to achieve a finished surface roughness of about 1 to 5 microns.

This will be explained in more detail with reference to FIGS. 5 and 6. As illustrated schematically in FIG. 5, it is assumed that the electrode is divided into two segments 2 and 2'. Current is supplied to the segments 2 and 2' via respective current transformers 15 and 15'. If the discharge first starts between the electrode segment 2 and the workpiece 9, after machining for, for example, ten minutes, due to consumption of the electrode 2, the discharge will shift to the segment 2'. Then, discharge continues between the electrode segment 2' and the workpiece 9 until the electrode segment 2' has been consumed more than the electrode segment 2, at which time the discharge shifts back to between the electrode segment 2 and the workpiece 9. This switching back and forth of the discharge makes it difficult to achieve precision machining.

Furthermore, it may be considered to employ silicon as the material of the electrode. In this case, the concentration of the discharge on only one of the electrode segments 2 and 2' for long periods is prevented, that is, the discharge will be effected between the electrode segments 2 and 2' on the one hand and the workpiece 9 on the other continuously. It has also been considered to use a segmented silicon electrode wherein the electrode is composed of a number of thin silicon plates.

The use of silicon electrodes does allow a finished surface roughness of as small as 1 micron to be obtained over an area of about 20 to 50 cm$^2$ after a machining time of only several tens of minutes. This is, of course, much shorter than the time required with conventional copper electrodes. It is invented that silicon or other materials which has the same characteristics like silicon will be used as an electrode for EDM.

SUMMARY OF THE INVENTION

Accordingly, it is a primary object of the present invention to provide an electrode for use in precision electric discharge machining which overcomes the drawbacks mentioned above. Specifically, it is an object of the present invention to provide such an electrode which is not segmented, that is, is a solid electrode, without sacrifice of surface roughness.

In accordance with the above and other objects, the present invention provides an electrode suitable for precision electric discharge machining formed by dissolving or finely mixing a substance having a high electrical resistance with silicon or other materials like silicon or a metal having a low melting point uncovering a body of the metal with the resulting composition. For the substance having a high electrical resistance, inorganic compounds such as semiconductors, carbides, oxides and salts of the metal can be employed. For the metal, zinc and alloys thereof are preferred.

BRIEF DESCRIPTION OF THE DRAWINGS

FIG. 7A illustrates an electrode embodying the invention;

FIG. 7B is an equivalent circuit diagram for the electrode of FIG. 7A;

FIG. 8A illustrates the formation of bridges in machining when a conventional electrode is employed; and FIG. 8B illustrates the same in the case that the inventive electrode is employed.

DESCRIPTION OF THE PREFERRED EMBODIMENTS

Figure 1:
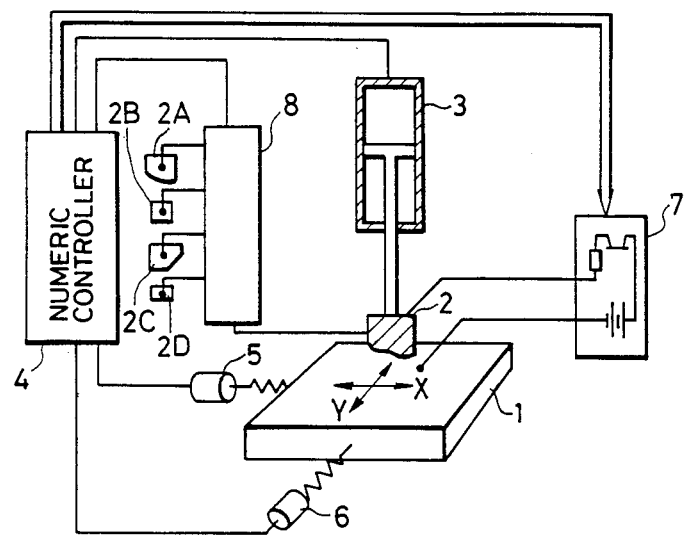
FIG. 1 is a schematic diagram illustrating a conventional discharge machining apparatus.
Figure 2:
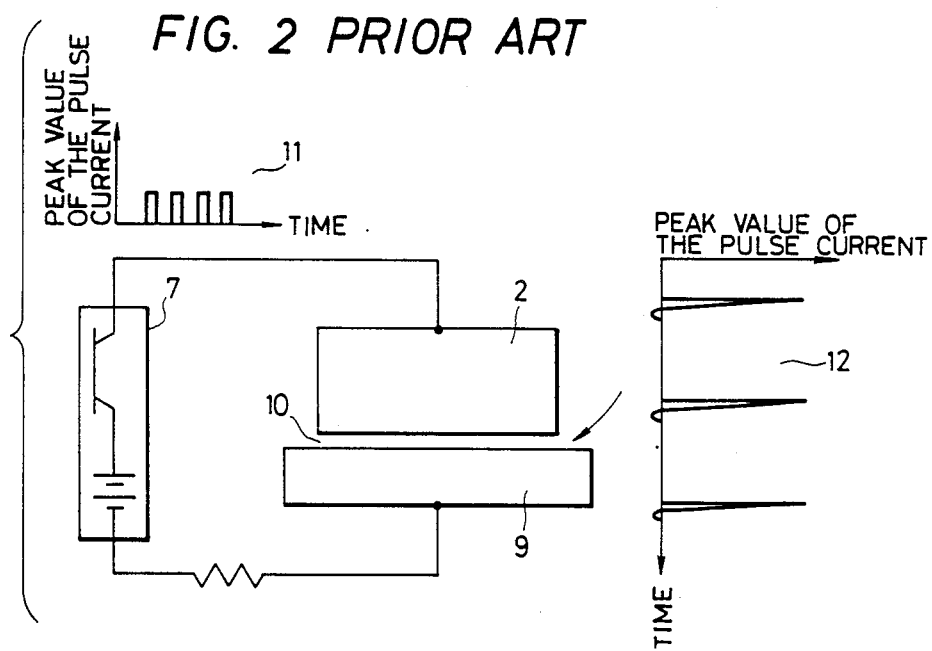
FIG. 2 is a diagram illustrating in more detail the electrode and workpiece and current waveforms in the apparatus of FIG. 1.
Figure 3:
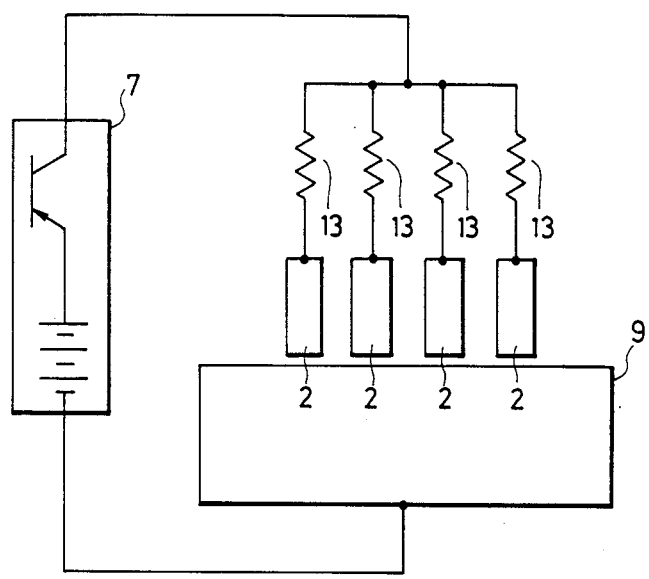
FIGS. 3 and 4 are schematic diagrams illustrating conventional approaches to overcome problems with conventional electrodes.
Figure 4:
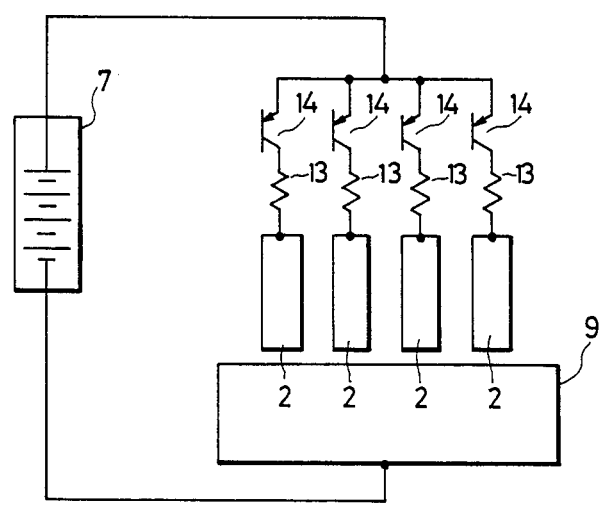
Figure 5:
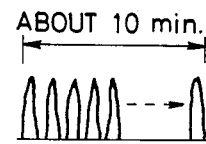
FIG. 5 is a schematic diagram used to illustrate concentration of discharge.
Figure 6:
FIG. 6 shows in the upper half thereof waveforms in the circuit of FIG. 5 in the case that a conventional electrode is used and the in the lower half similar waveforms for the case of an electrode of the invention.
Figure 6:
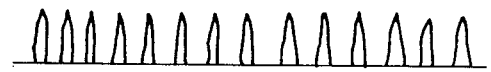
Figure 6:
Figure 7C:
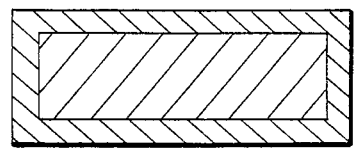
FIG. 7C shows a cross section of the electrode of FIG. 7A with a base and a covering layer.

Preferred embodiments of the invention will now be described by way of examples.

Example 1

An electrode was formed by silicon plate. The use of this type of electrode, the area of which is 275 cm$^2$, realize the roughness 2 $\mu$m under high removal rate.

Example 2

An electrode was formed by covering a body of zinc with a composition of 90 wt % zinc and 10 wt % coarse silicon. Using this electrode, machining was carried out as with the conventional electrode. Compared with the conventional electrode, for precision machining, the machining rate (rate of removal of the material of the workpiece) was about ten times that of the conventional electrode. Moreover, a finish surface roughness of about 1 micron was easily attained. Although the rate of consumption of the electrode was about four to five times that of a copper electrode, this makes little difference for purposes of finish machining.

Example 3

An electrode was formed in the same manner as in Example 2, but with 80 wt% zinc and 20 wt% zinc oxide. In this case, the machining rate was approximately eight times that obtainable with the copper electrode. Again, a finish surface roughness of about 1 micron was easily obtained. The electrode consumption rate was approximately the same as in the case of Example 1 for a machining gap width of approximately 20 microns.

For the metal of the electrode of the invention, low melting point metals such as zinc and alloys thereof are preferred. Compounds such as ZnS, ZnSe, ZnTe, CdS, CdSe, CdTe, GaAs, GaP, GaSb, GaN, GaS, GaSe, InAs, InP, InSb, AlAs, PbS, PbSe, PbTe, Bi$_2$Te$_3$, Bi$_2$Se$_3$, ZnFe$_2$O$_4$, and NiMn$_2$O$_4$ may be employed. For the high resistivity material mixed or dissolved with the above material there may be employed inorganic compound materials such as simple or compound semiconductors, carbides, oxides and salts of the metal, and carbonic materials. The material so prepared can then be thermally sprayed onto a base of the metal, or formed as a powder and then sintered onto a base of the metal in order to prepare an electrode.

The electrodes of the invention have the following features and advantages:

(1) The inventive electrodes are less expensive than silicon electrodes and are less likely broken in use.

(2) Due to the inherent resistance of the electrodes of the invention, little electric charging occurs. Accordingly, the discharge is more evenly spread over the face of the electrode, and there is little danger of unwanted discharge such as occurs with the copper electrode. Moreover, a very fine surface finish can be obtained, particularly, by using a zinc/silicon or zinc/zinc oxide electrode.

(3) The use of a low-melting point metal does result in an electrode having a higher consumption rate than a conventional copper electrode. However, because a wider machining gap can be employed, the discharge is further diffused, reducing concentrations of the electric field, and thereby reducing the chance of unwanted discharging. This will be explained in more detail with reference to FIGS. 8A and 8B.

FIG. 8A shows the generation of bridging between the electrode 2 and the workpiece 9 which frequently occurs when a copper electrode is employed. As can be seen from this drawing, projections are formed on the electrode 2 and the workpiece 9 which can short-circuit the electrode to the workpiece 9. On the other hand, in the case of the invention, as illustrated in FIG. 8B, because the machining gap is broader, there is no danger of shortcircuiting between the electrode 2 and the workpiece 9. Moreover, the average distance on the surface of the electrode 2 and the workpiece 9 between projections is greater in the case of the electrode of the invention. Accordingly, there is less concentration of electric field, and thereby a more uniform discharge is produced.

This completes the description of the preferred embodiments of the invention. Although preferred embodiments have been described, it is believed that numerous modifications and alterations thereto would be apparent to one having ordinary skill in the art without departing from the spirit and scope of the invention.

We claim:

1. An electrode for precision discharge maching, comprising: a base made of an alloy of a low melting point metal which is a material selected from the group consisting of Si, ZnO, $ZnO_2$, $ZnSiO_2$, ZnS, ZnSe, ZnTe, CdS, CdSe, CdTe, GaAs, GaP, GaSb, GaN, GaS, GaSe, InAs, InP, InSb, AlAs, PbS, PbSe, PbTe, $Bi_2Te_3$, $Bi_2Se_3$, $ZnFe_2O_4$, and $NiMn_2O_4$; and a covering layer formed of one of a mixture and solutions of said low melting point metal, semi metals, semi conductors, and high resistivity inorganic compounds.

2. The electrode of claim 1, wherein said inorganic compounds are selected from the group consisting of simple and compound semiconductor materials, carbides, oxides, salts, and carbonic materials.

3. The electrode of claim 1, wherein said layer comprises a thermally sprayed layer.

4. The electrode of claim 1, wherein said layer comprises a powder metal sintered layer formed over said base.

5. The electrode of claim 1, wherein said layer comprises a sintered layer.

* * * * *